INVENTOR
WILLIAM G. BATTE

BY

ATTORNEYS

INVENTOR
WILLIAM G. BATTE

BY

ATTORNEYS

INVENTOR
WILLIAM G. BATTE

BY
ATTORNEYS

United States Patent Office 3,512,009
Patented May 12, 1970

3,512,009
EXCLUSIVE-OR DIGITAL LOGIC MODULE
William G. Batte, Hampton, Va., assignor to the United States of America as represented by the Administrator of the National Aeronautics and Space Administration
Filed May 22, 1967, Ser. No. 641,441
Int. Cl. H03k 19/32
U.S. Cl. 307—216 1 Claim

ABSTRACT OF THE DISCLOSURE

This invention is an Exclusive-Or digital logic circuit. A pair of inputs are connected through a biased diode circuit to the base-emitter junction of a transistor. When one of the inputs is true and the other is false, the transistor is switched to its opposite state. However, when both inputs are either true or false, the transistor is not switched. Additional circuitry is included for inverting, restoring and amplifying the output from the transistor.

The invention described herein was made by an employee of the U.S. Government and may be manufactured and used by or for the Government for governmental purposes without the payment of any royalties thereon or therefor.

BACKGROUND OF THE INVENTION

The simplest Exclusive-Or logic circuit is a logic circuit having two inputs and a single output. The output is true (i.e., a pulse or signal is generated) if, and only if, one of the inputs is true and the other is false. If both inputs are true or both are false, the output signal is false.

Exclusive-Or circuits have found widespread use in digital logic networks. For example, they have been particularly useful in binary adder networks in which one binary number is added to another binary number so that it is necessary to obtain sum signals and carry signals result from the addition. Because of its unique properties, the Exclusive-Or circuit has found widespread use in determining these signals. In addition, Exclusive-Or circuits are useful in general digital logic networks. That is, they are useful in general data processing systems when an Exclusive-Or type logic function is required.

While Exclusive-Or circuits have found widespread use, their formation has not been entirely satisfactory. For example, many prior art Exclusive-Or circuits have required an excessively large number of module connections (normally five) to produce a circuit that performs this one logic function. More specifically, many prior art Exclusive-Or circuits have been formed from a combination of conventional (AND, OR, NOR, NAND, etc.) circuits by interconnecting modules containing these circuits. And, this interconnection is rather extensive and time-consuming. Moreover, the interconnection of a large number of individual modules raises the possibility of interconnection error and reduces the reliability of the system incorporating the large number of modules. In addition, the cost of initially forming a large number of modules is higher than the cost of forming a single module. Hence, it is desirable to provide an Exclusive-Or logic circuit that can be formed in a single module resulting in the reduced cost and increased reliability.

Therefore, it is an object of this invention to provide a new and improved Exclusive-Or logic circuit.

It is also an object of this invention to provide a new and improved Exclusive-Or digital logic module that is simple and uncomplicated.

It is still another object of this invention to provide an Exclusive-Or digital logic circuit that can be formed into a single module.

It is a still further object of this invention to provide a new and improved Exclusive-Or digital logic module that is highly reliable yet simple and uncomplicated.

SUMMARY OF THE INVENTION

In accordance with a principle of this invention, new and improved Exclusive-Or digital logic circuits are provided by unique combinations of biased diode networks and switching transistors. In one form, a pair of diodes each have a similar terminal connected together and to the emitter of a transistor. The other terminals of the diodes are connected to separate input terminals and are connected together through a biased resistive circuit. The biased resistive circuit is also connected to the base of the transistor. When one of the inputs is true and the other is false, the transistor is switched on. And, when both of the inputs are either true or false, the transistor is switched off. Hence, the invention provides a simple circuit that performs an Exclusive-Or function. And, it will be appreciated by those skilled in the art that the circuit can be formed into a single logic module.

In accordance with a further principle of this invention, a second transistor is connected to the output of the first transistor through a signal restoring network. The second transistor inverts and amplifies the output from the first transistor so that the output signal is restored, inverted and amplified. It will be appreciated by those skilled in the art and others that in certain environments, it is essential to include these functions in a digital logic module. And, it is easy to add these additional elements to the Exclusive-Or circuit of the invention to form an overall module that not only provides an Exclusive-Or function, but also amplifies, restores and inverts the Exclusive-Or output.

DESCRIPTION OF THE PREFERRED EMBODIMENTS

Figure 1:
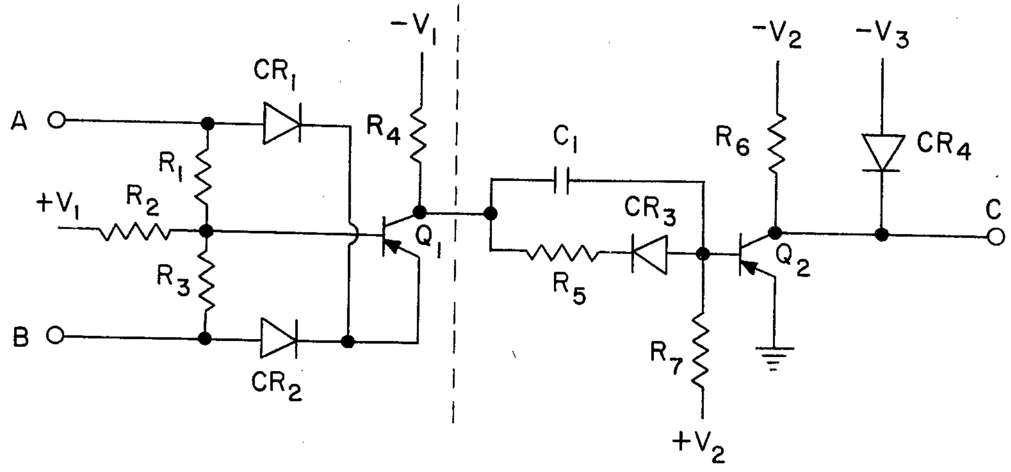
FIG. 1 is a schematic diagram illustrating one embodiment of the invention that includes the inverting, restoring and amplifying functions.

FIG. 1 illustrates one embodiment of the invention and comprises an Exclusive-Or logic circuit illustrated to the left of the dashed line and a signal conditioning circuit illustrated to the right of the dashed line. The Exclusive-Or circuit comprises: first and second diodes designated CR1 and CR2; a first PNP transistor designated Q1; and first, second, third, and fourth resistors designated R1, R2, R3 and R4.

A first input terminal A is connected to the anode of the first diode CR1 and a second input terminal B is connected to the anode of the second diode CR2. The cathodes of CR1 and CR2 are connected together and to the emitter of Q1. The first and second resistors R1 and R2 are connected in series between the anodes of CR1 and CR2. The junction between R1 and R2 is connected through the third resistor R3 to a first positive voltage source designated $+V_1$. The junction between R1 and R2 is also connected to the base of Q1. R4 is connected between the first negative voltage source, designated $-V_1$, and the collector of Q1.

The signal conditioning circuit comprises: third and fourth diodes designated CR3 and CR4; a second PNP transistor designated Q2; a first capacitor designated C1; and, fifth, sixth and seventh resistors designated R5, R6 and R7. The collector of Q1 is connected through the first capacitor C1 to the base of the second transistor Q2. The base of Q2 is also connected to the anode of the third diode CR3 and through the seventh resistor R7 to a second positive voltage source designated $+V_2$. The fifth resistor R5 is connected between the collector of Q1 and the cathode of CR3. The emitter of Q2 is connected to ground. The sixth resistor R6 is connected between the collector of Q2 and a second negative source designated $-V_2$. The collector of Q2 is also connected to the cathode of fourth diode CR4, and the anode of CR4 is connected to a third negative voltage source designated $-V_3$. Finally, the collector of Q2 is connected to an output terminal C.

In operation, when common signals, be they both true or both false, are applied to input terminals A and B, Q1 is biased off by voltage source $+V_1$. However, when a true signal is applied to input terminal A and a false signal is applied to input terminal B, or vice versa, Q1 has a forward-biased base emitter junction and is turned on.

More specifically, in an actual embodiment of the invention, the following component values were used:

R1, R2—8,200 ohms, ¼ watt
R3—56,000 ohms, ¼ watt
R4—6,800 ohms, ¼ watt
Q1—2N1301
CR1, CR2—1N276
$+V_1$—+12 volts
$-V_1$—−18 volts
True—−6 volts
False—0 volts Considering the foregoing component values and the foregoing true and false values, it will be appreciated by those skilled in the art, that the emitter base junction of the first transistor Q1 of the embodiment of the invenion illustrated in FIG. 1 is forward-biased when a true signal is applied to terminal A and a false signal is applied to terminal B, or vice versa; that is, Q1 is turned on. For example, when a 0 volt (false) signal is applied to input A and a −6 volt (true) signal is applied to input B, the voltage of the emitter of Q1 is approximately zero and the voltage of the base of Q1 seeks approximately −3 volts; hence, the emitter-base junction is forward-biased. However, the junction of Q1 is biased off when either true signals or false signals are simultaneously applied to both of the input terminals because approximately the same voltage is applied to both the emitter and the base. Hence, FIG. 1 is an Exclusive-Or circuit wherein Q1 is turned on if, but only if, either of the two inputs is true and the other is false. R3 optimizes input noise rejection by establishing the proper turn on threshold for Q1.

The signal conditioning portion of the embodiment illustrated in FIG. 1 amplifies, restores and inverts the signal from transistor Q1. The restoring circuit comprises the first capacitor C1, the third diode CR3, and the fifth resistor R5. This circuit sharpens the output from the first transistor. Transistor Q2 inverts the output from Q1 and amplifies it. This output is then applied to the output terminal C.

With the above component values for the Exclusive-Or circuit, the following component values for the signal conditioning portion have been used in an embodiment of the restoring, inverting and amplifying portion of FIG. 1:

R5, R6—2,700 ohms, ¼ watt
R7—15,000 ohms, ¼ watt
C1—150 pf.
CR3—1N816
CR4—1N276
Q2—2N1301
$+V_2$—+12 volts
$-V_2$—−18 volts
$-V_3$—−6 volts With the above component values transistor Q2 is biased on to create a zero output signal when transistor Q1 is biased off. That is, the base bias voltage for Q2 is determined by the current flowing from $+V_2$ to $-V_1$ through the circuit comprising R4, R5, CR3 and R7. And, due to the resistive values the voltage at the base of Q2 is negative when Q1 is off—this negative voltage turns Q2 on. However, when Q1 is turned on the voltage at the base Q2 becomes positive and it turns off to generate an output voltage between its collector and ground. This output voltage is negative and hence is an inversion of the positive voltage (at the base of Q2) required to create it. Further, because of Q2's $\beta$ factor, it is an amplification of the input signal.

It will be appreciated from the foregoing description that the embodiment of the invention illustrated in FIG. 1 is an Exclusive-Or logic circuit plus a circuit for restoring, inverting and amplifying the output from the Exclusive-Or circuit. Both the Exclusive-Or circuit per se or the Exclusive-Or circuit plus the signal conditioning network are suitable for formation as a single logic module. The overall module will then perform either an Exclusive-Or function or an Exclusive-Or function plus amplification, restoration and inversion.

Figure 2:
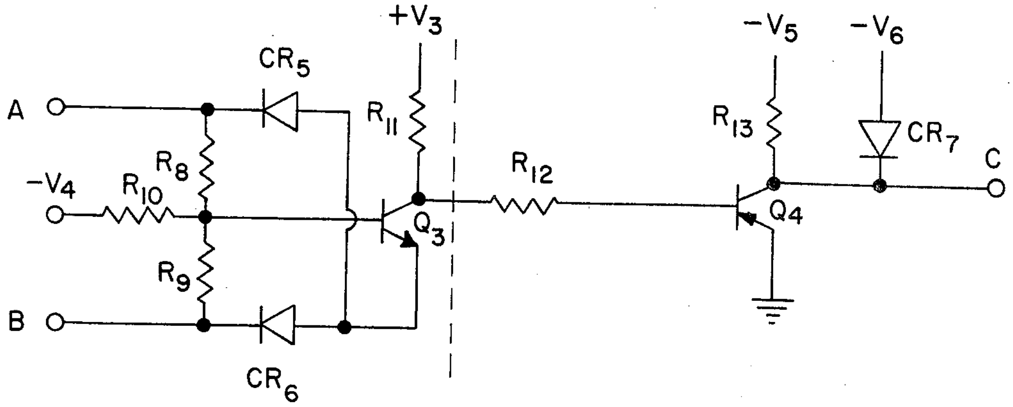
FIGS. 2–5 are alternate embodiments of the invention.

FIG. 2 illustrates an alternative embodiment of the invention that comprises an Exclusive-Or circuit on the left and a signal conditioning circuit on the right. The Exclusive-Or circuit comprises: first and second diodes designated CR5 and CR6; first, second, third and fourth resistors designated R8, R9, R10 and R11; and a first NPN transistor designated Q3. The cathodes of CR5 and CR6 are respectively connected to input terminals A and B. The anodes of CR5 and CR6 are connected together and to the emitter of Q3. R8 and R9 are connected in series between the cathodes of CR5 and CR6. The junction between R8 and R9 is connected to the base of Q3 and through R10 to a first negative voltage source designated $-V_4$. And, R11 is connected between a first positive voltage source, designated $+V_3$, and the collector of Q3.

The signal conditioning circuit of FIG. 2 comprises: a third diode designated CR7; fifth and sixth resistors designated R12 and R13; and a first PNP transistor designated Q4. R12 is connected between the collector of Q3 and the base of Q4. The emitter of Q4 is connected to ground and the collector of Q4 is connected through R13 to a second negative voltage source designated $-V_5$. The collector of Q4 is also connected to the cathode of CR7 and the anode of CR7 is connected to a third negative voltage source designated $-V_6$. Finally, the collector of Q4 is connected to the output terminal C.

The Exclusive-Or portion of the invention illustrated in FIG. 2 operates similarly to the Exclusive-Or portion of the invention illustrated in FIG. 1 and described above. However, because FIG. 2 uses an NPN transistor as opposed to the PNP transistor of FIG. 1 and because it uses oppositely biased diodes, the bias voltages while of opposite polarity must also have different values for a false zero signal and a true negative signal to operate the circuit. Specifically, a $-V_4$ of −18 volts and $+V_3$ of +12 volts have been used in one embodiment of FIG. 2. With these values, Q1 is turned on for a true/false signal or of false/true signal but not for a true/true signal or a false/false signal.

The signal conditioning circuit illustrated in FIG. 2 inverts and amplifies the output from Q3 as did the signal conditioning circuit illustrated in FIG. 1. Although Q4 always has the same state as Q3 (i.e., Q3 is on when Q4 is on) the signal is inverted since complementary transistors are used. When Q3 is off a positive voltage is applied to Q4 and biases it off. However, when Q3 is turned on, because of the occurrence of an Exclusive-Or input condition at input terminals A and B, Q4 is turned on to generate zero-volt output signal at the output terminal C. More specifically, a positive, reverse bias voltage is applied to the emitter base junction of Q4 when Q3 is off. However, when Q3 is turned on because of a true/false input condition, a negative forward bias voltage is applied to the emitter base junction of Q4. The collector of Q3 goes negative due to the bias and true/false input signals to create this negative, forward bias for Q4.

In logic notation the output from FIG. 1 is represented as $A \oplus B$ because it generates a true output signal if, and only if, one of its inputs is true and the other is false. And, in logic notation the output from FIG. 2 is represented as $\overline{A \oplus B}$ because it generates a false output signal if, and only if, one of its inputs is true and the other is false. Or, for the positive logic convention wherein the zero volt and −6 volt levels are interpreted as true and false, respectively, the output of FIG. 2 is represented as $A \oplus B$.

Figure 3:
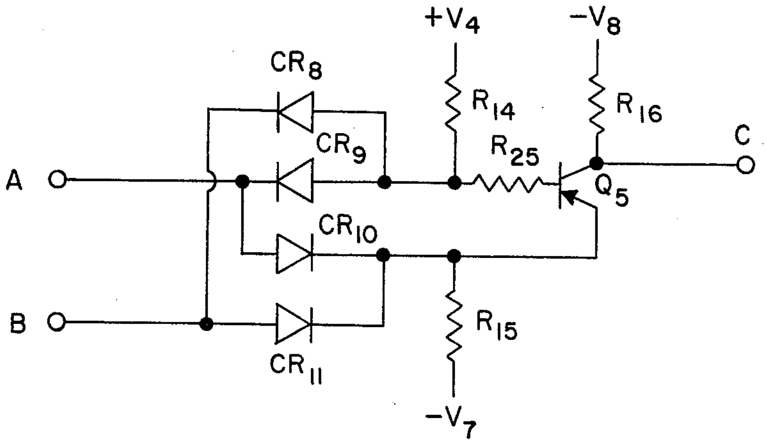

FIG. 3 is an alternative embodiment of the Exclusive-Or portion of the invention and comprises: first, second, third and fourth diodes designated CR8, CR9, CR10 and CR11; a PNP transistor designated Q5; and first, second and fourth resistors designated R14, R15, R16 and R25.

The anodes of CR8 and CR9 are connected together and to the base of Q5 through R25. The cathodes of CR10 and CR11 are connected together and to the emitter of Q5. The cathode of CR9 and the anode of CR10 are connected together and to input terminal A. Similarly, the cathode of CR8 and to the anode of CR11 are connected together and to input terminal B. R25 is connected through R14 to a first positive voltage source designated $+V_4$ and the emitter of Q5 is connected through R15 to a first negative voltage source designated $-V_7$. The collector of Q5 is connected to an output terminal and through R16 to a second negative voltage source designated $-V_8$.

The Exclusive-Or embodiment illustrated in FIG. 3 operates similarly to the embodiments illustrated in FIGS. 1 and 2. That is, when similar signals, both true or false, are applied to input terminals A and B, transistor Q5 is biased off. However, when a true signal is applied to one input terminal and a false signal is applied to the other input terminal transistor Q5 is biased on. Therefore, the logical notation of the output from FIG. 3 is $\overline{A \oplus B}$ (or simply $A \oplus B$ for the positive logic convention).

Figure 4:
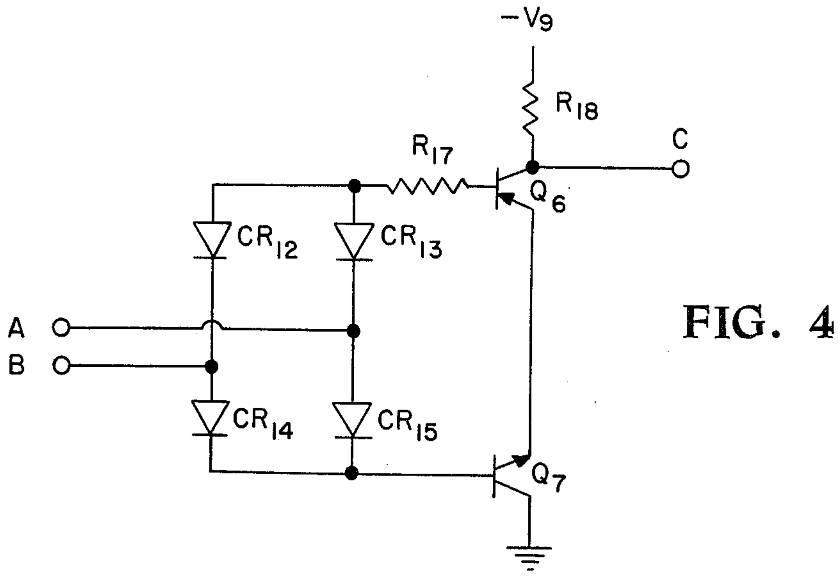

FIG. 4 illustrates yet another embodiment of the Exclusive-Or portion of the invention and comprises: first, second, third and fourth diodes designated CR12, CR13, CR14 and CR15; first and second transistors designated Q6 and Q7; and first and second resistors designated R17 and R18. Transistor Q6 is a PNP transistor while transistor Q7 is an NPN transistor.

The cathode of CR12 is connected to the anode of CR14 and to input terminal B. Similarly, the cathode CR13 is connected to the anode of CR15 and to input terminal A. The anodes of CR12 and CR13 are connected together and through R17 to the base of Q6 while the cathodes of CR14 and CR15 are connected together and to the base of Q7. Hence, diodes CR12, CR13, CR14 and CR15 form a diode bridge network. The collector of Q7 is connected to ground and the emitter of Q7 is connected to the emitter of Q6. The collector of Q6 is connected through R18 to a first negative voltage source designated $-V_9$. Further, the collector of Q6 is connected to an output terminal.

The embodiment of the invention illustrated in FIG. 4 operates in the manner similar to the Exclusive-Or portion of the embodiments of the invention illustrated in FIGS. 1–3. That is, when the input signals to input terminals A and B are similar, i.e. both true or false, the transistors are biased off. However, when one input signal is true and the other false, one input signal biases Q6 on and the other input signal biases Q7 on. Hence, when true and false input signals are simultaneously applied, the output signal changes so that the circuit performs an Exclusive-Or function. The logical notation for the circuit illustrated in FIG. 4 is $\overline{A \oplus B}$ because the output is false when the input signals are true and false or vice versa (or simply $A \oplus B$ for the positive logic convention).

Figure 5:
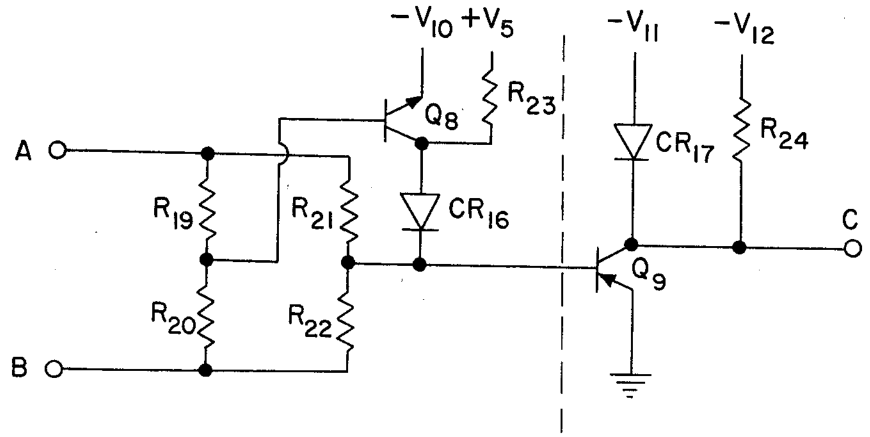

FIG. 5 illustrates still another embodiment of the invention that includes an Exclusive-Or circuit on the left and an amplifier circuit on the right. The Exclusive-Or portion of the embodiment of the invention illustrated in FIG. 5 comprises: a first diode designated CR16; an NPN transistor designated Q8; and first, second, third, fourth, and fifth resistors designated R19, R20, R21, R22 and R23. Input terminal A is connected through the series connected R19 and R20 to input terminal B and through the series connected R21 and R22 to input terminal B. Hence, resistors R19, R20, R21 and R22 form a bridge network. The junction between R19 and R20 is connected to the base of Q8 and the junction between R21 and R22 is connected to the cathode of CR16. The anode of CR16 is connected to the collector of Q8 and through R23 to a first positive voltage source designated $+V_5$. The emitter of Q8 is connected to a first negative voltage source designated $-V_{10}$.

The amplifier circuit of FIG. 5 comprises: a PNP transistor designated Q9; a second diode designated CR17; and a sixth resistor designated R24. The junction between R21 and R22 is connected to the base of Q9 and the emitter of Q9 is connected to ground. The collector of Q9 is connected to the cathode of CR17 and the anode of CR17 is connected to a second negative voltage source designated $-V_{11}$. The collector of Q9 is also connected through R24 to a third negative voltage source designated $-V_{12}$. Finally, the collector of Q9 is connected to the output terminal C.

The Exclusive-Or portion of the invention illustrated in FIG. 5 operates so that when both A and B are false Q9 does not conduct. Hence, C is true. When both A and B are true, Q8 does not conduct, and consequently Q9 is biased off by $+V_5$ through R23 and CR16. Therefore, for this latter condition C is also true. However, when one input is true and the other is false, Q8 conducts and thereby back biases CR16. As a result Q9 is forward biased by R21 and R23 and, hence, C is false. Therefore, an Exclusive-Or function is provided by the circuit of FIG. 5. Amplification is provided by Q9. The logical notation for the output of FIG. 5 is $\overline{A \oplus B}$ (or simply $A \oplus B$ for the positive logic convention).

Figure 6:
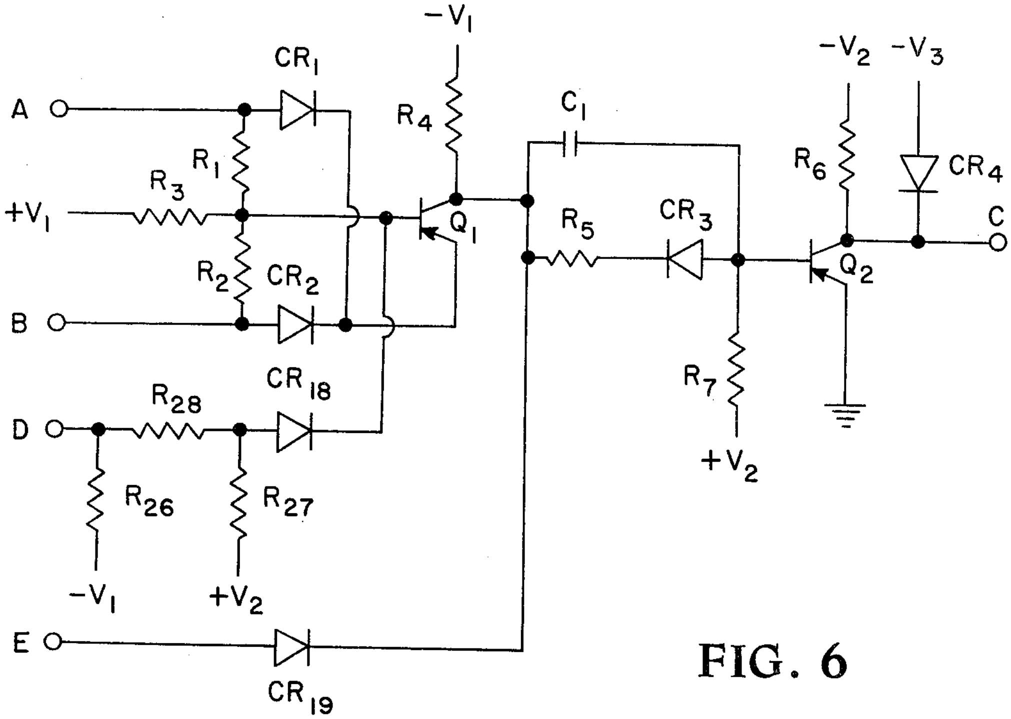
FIG. 6 is a further embodiment of the invention that includes an additional AND function.

FIG. 6 illustrates a further embodiment of the invention that is identical to the embodiment illustrated in FIG. 1 except for the addition of third and fourth input terminals D and E; fifth and sixth diodes designated CR18 and CR19; and eighth, ninth, and tenth resistors designated R26, R27 and R28. Input terminal D is connected to $-V_1$ through R26 and to the anode of CR18 through R28. The anode of CR18 is connected to $+V_2$ through R27. The cathode of CR18 is connected to the base of Q1. Input terminal E is connected to the anode of CR19 and the cathode of CR19 is connected to the collector of Q1.

The addition of CR18, R26, R27, R28 and the third input terminal D adds an additional function to the embodiment illustrated in FIG. 1. Specifically, Q1 is not turned on unless both the D input is true and $A \oplus B$ is true. That is, in FIG. 1 the output is an Exclusive-Or function between A and B logically noted as $A \oplus B$. In FIG. 6 the output is an Exclusive-Or function of A and B plus an AND function logically noted as $D(A \oplus B)$.

The addition of CR19 to the fourth input terminal E adds another additional function to the embodiment illustrated in FIG. 1. This function logically is an Inhibit-Or function. Therefore, the combined output at C on FIG. 6 is logically noted as $D(A \oplus B)+\overline{E}$.

It will be appreciated by those skilled in the art and other that the foregoing embodiments of the invention are merely by way of example and that numerous other embodiments are possible in light of the inventive teachings. For example, the embodiments of the invention illustrated in FIGS. 1–6 have been described as controlled by negative true signals and zero false signals, however, PNP transistors can be substituted for NPN transistors and vice versa, the polarity of the diodes can be reversed, and the polarity of the voltage sources can be reversed so that the embodiments are controlled by positive true signals and zero false signals. Further, the inverting, amplifying and restoring portions of the invention illustrated and described with respect to FIG. 1 can be used with the embodiments of the Exclusive-Or circuits illustrated in FIGS. 2–5. Hence, the invention can be practiced otherwise than as specifically described herein.

What is claimed is:

1. An Exclusive-Or circuit comprising:

first and second diodes with the cathode of the first connected to the anode of the second;

third and fourth diodes with the cathode of the third connected to the anode of the fourth and with the anodes of the first and third diodes connected together and the cathodes of the second and fourth diodes connected together;

a switching transistor with its emitter connected to the cathodes of said second and fourth diodes;

a first resistor connected between the anodes of the said first and third diodes and the base of said transistor;

a first potential connected through a second resistor to the collector of said transistor;

a second potential connected through a third resistor to the anodes of said first and third diodes; and a third potential different from said second potential connected through a fourth resistor to the emitter of said switching transistor whereby the potential at the collector of said switching transistor is the Exclusive-Or function of potentials applied to the junctions of said first and second, and said third and fourth diodes.

References Cited

UNITED STATES PATENTS

| | | | |
|---|---|---|---|
| 2,629,834 | 2/1953 | Trent | 307—216 |
| 2,850,647 | 9/1958 | Fleisher | 307—216 |
| 3,309,531 | 3/1967 | Hearn et al. | 307—216 |

FOREIGN PATENTS

| | | |
|---|---|---|
| 873,500 | 7/1961 | Great Britain. |

JOHN S. HEYMAN, Primary Examiner

S. T. KRAWCZEWICZ, Assistant Examiner

U.S. Cl. X.R.

307—207, 317